United States Patent
Mo et al.

(10) Patent No.: US 7,385,917 B1
(45) Date of Patent: Jun. 10, 2008

(54) METHOD AND SYSTEM FOR PROVIDING A PROTECTION PATH FOR CONNECTIONLESS SIGNALS IN A TELECOMMUNICATIONS NETWORK

(75) Inventors: Li Mo, Plano, TX (US); David W. Wynn, Garland, TX (US); Indra Widjaja, Nanuet, NY (US); Edward T. Sullivan, Highland Village, TX (US)

(73) Assignee: Fujitsu Limited, Kawasaki (JP)

( * ) Notice: Subject to any disclaimer, the term of this patent is extended or adjusted under 35 U.S.C. 154(b) by 889 days.

(21) Appl. No.: 09/589,038

(22) Filed: Jun. 6, 2000

Related U.S. Application Data

(60) Provisional application No. 60/202,190, filed on May 5, 2000.

(51) Int. Cl.
*H04J 1/16* (2006.01)
*H04L 1/00* (2006.01)
*H04L 12/66* (2006.01)

(52) U.S. Cl. .................. 370/216; 370/217; 370/225

(58) Field of Classification Search ............... 370/216, 370/217, 218, 219, 220, 395.51, 465, 228, 370/227, 244, 396, 404, 351, 408, 223, 258, 370/406, 221, 222, 225, 224, 395.31, 229, 370/395.52
See application file for complete search history.

(56) References Cited

U.S. PATENT DOCUMENTS

| | | | |
|---|---|---|---|
| 5,229,990 A | 7/1993 | Teraslinna | 370/60 |
| 5,231,633 A | 7/1993 | Hluchyj et al. | 370/94.1 |
| 5,442,623 A * | 8/1995 | Wu | 370/224 |
| 5,461,624 A | 10/1995 | Mazzola | 370/85.13 |
| 5,533,016 A * | 7/1996 | Cook et al. | 370/351 |
| 5,590,133 A | 12/1996 | Billström et al. | 370/349 |
| 5,771,370 A | 6/1998 | Klein | 395/500 |
| 5,781,534 A | 7/1998 | Perlman et al. | 370/248 |
| 5,818,842 A | 10/1998 | Burwell et al. | 370/397 |
| 5,825,772 A | 10/1998 | Dobbins et al. | 370/396 |
| 5,850,399 A | 12/1998 | Ganmukhi et al. | 370/412 |
| 5,852,606 A | 12/1998 | Prince et al. | 370/393 |
| 5,946,308 A | 8/1999 | Dobbins et al. | 370/392 |

(Continued)

FOREIGN PATENT DOCUMENTS

EP 0 512 495 A2 11/1992

(Continued)

OTHER PUBLICATIONS

International Preliminary Examination Report in International Application No. PCT/US01/13695, dated Oct. 30, 2002, 4 pages.

(Continued)

*Primary Examiner*—Edan Orgad
*Assistant Examiner*—Chuong Ho
(74) *Attorney, Agent, or Firm*—Baker Botts L.L.P.

(57) ABSTRACT

A method is provided for providing protection for connectionless signals in a telecommunications network comprising a plurality of nodes. A first protection path is generated from each of the nodes to a destination node. A second protection path is generated from each of the nodes to the destination node. The second protection path is distinct from the first protection path. Protection traffic is routed along one of the protection paths to the destination node.

14 Claims, 7 Drawing Sheets

U.S. PATENT DOCUMENTS

| | | | |
|---|---|---|---|
| 5,949,755 A * | 9/1999 | Uphadya et al. | 370/224 |
| 5,956,341 A | 9/1999 | Galand et al. | 370/412 |
| 6,018,766 A | 1/2000 | Samuel et al. | 709/218 |
| 6,028,842 A | 2/2000 | Chapman et al. | 370/235 |
| 6,058,113 A | 5/2000 | Chang | 370/390 |
| 6,075,767 A | 6/2000 | Sakamoto et al. | 370/228 |
| 6,122,249 A * | 9/2000 | Mochizuki et al. | 370/220 |
| 6,205,158 B1 * | 3/2001 | Martin et al. | 370/541 |
| 6,222,653 B1 * | 4/2001 | Asahi | 359/110 |
| 6,226,111 B1 * | 5/2001 | Chang et al. | 398/9 |
| 6,256,292 B1 * | 7/2001 | Ellis et al. | 370/227 |
| 6,259,837 B1 * | 7/2001 | de Boer et al. | 385/24 |
| 6,272,107 B1 * | 8/2001 | Rochberger et al. | 370/216 |
| 6,317,426 B1 | 11/2001 | Afanador et al. | 370/352 |
| 6,331,905 B1 * | 12/2001 | Ellinas et al. | 398/2 |
| 6,353,593 B1 * | 3/2002 | Chen et al. | 370/216 |
| 6,353,616 B1 | 3/2002 | Elwalid et al. | 370/443 |
| 6,359,857 B1 | 3/2002 | Ahmad et al. | 370/217 |
| 6,366,556 B1 * | 4/2002 | Ballintine et al. | 370/216 |
| 6,473,397 B1 * | 10/2002 | Au | 370/223 |
| 6,501,758 B1 * | 12/2002 | Chen et al. | 370/395.1 |
| 6,515,966 B1 | 2/2003 | Bardalai et al. | 370/236 |
| 6,574,192 B1 * | 6/2003 | Egnell | 370/224 |
| 6,657,952 B1 * | 12/2003 | Shiragaki et al. | 370/223 |
| 6,658,457 B2 * | 12/2003 | Nishikawa et al. | 709/206 |
| 6,711,125 B1 * | 3/2004 | Walrand et al. | 370/223 |
| 6,765,880 B1 * | 7/2004 | Hillard et al. | 370/255 |
| 6,775,229 B1 * | 8/2004 | Mo et al. | 370/220 |
| 7,274,869 B1 * | 9/2007 | Pan | 398/5 |
| 2001/0025310 A1 | 9/2001 | Krishnamurthy et al. | 709/223 |
| 2003/0170020 A1 * | 9/2003 | Chaudhuri et al. | 398/5 |

FOREIGN PATENT DOCUMENTS

| | | |
|---|---|---|
| EP | 0 849 970 A2 | 6/1998 |
| EP | 0 959 641 A1 | 11/1999 |
| WO | WO 97/40610 | 10/1997 |
| WO | WO 98/00954 | 1/1998 |
| WO | WO 99/11090 | 3/1999 |
| WO | WO 99/66675 | 12/1999 |
| WO | WO 00/10357 | 2/2000 |
| WO | WO 00/21254 | 4/2000 |
| WO | WO 00/24164 | 4/2000 |

OTHER PUBLICATIONS

International Search Report in International Application No. PCT/US 01/13723, dated Oct. 31, 2001, 7 pages.

International Search Report in International Application No. PCT/US 01/13725, dated Oct. 31, 2001, 6 pages.

International Search Report in International Application No. PCT/US 01/14624, dated Nov. 6, 2001, 6 pages.

PCT Invitation to Pay Additional Fees in International Application No. PCT/US 01/13732, dated Nov. 7, 2001, 4 pages.

Tsong-Ho Wu, "A Passive Protected Self-Healing Mesh Network Architecture and Applications," *IEEE/ACM Transactions on Networking* XP 000446089, Feb. 1994, 13 pages.

PCT International Search Report No. PCT/US01/13724, dated Nov. 30, 2001, 6 pages.

Birman A et al.: "Support for RSVP-Based Services Over ATM Networks," Communications: The Key to Global Prosperity. Globecom 1996. Global Internet 96 Conference Record. London, Nov. 18-22, 1996, Global Telecommunications Conference (Globecom, New York, IEEE, US, vol. SUPP, Nov. 18, 1996 pp. 10-15, XP000741665 ISBN: 0-7803-3337-3.

Sharma et al.: "Scalable timers for soft state protocols," Infocom '97. Sixteenth Annual Joint Conference of the IEEE Computer and Communications Societies. Driving the Information Revolution., Proceedings IEEE Kobe, Japan Apr. 7-11, 1997, Los Alamitos, CA USA, IEEE Comptu. Soc, US Apr. 7, 1997, pp. 222-229, XP010252006, ISBN: 0-8186-7780-5.

International Search Report in International Application No. PCT/US01/14626, dated Feb. 5, 2002, 7 pages.

International Search Report in International Application No. PCT/US01/14622, dated Feb. 14, 2002, 7 pages.

Pancha P: "ATM Switch Routers for Combined Connection-Oriented and Connectionless Transport," ISS '97. World Telecommunications Congress. (Int'l Switching Symposium). Global Network Evolution: Convergence or Collision? Toronto, Sept. 21-26, 1997, ISS. World Telecommuncations Congress. (International Switching Symposium).

Mysore J. P. et al.: "Performance of transport protocols over a multicasting-based architecture fr Internet host mobility" Communications, 1998. ICC 98. Conference Record. 1998 IEEE International Conference on Atlanta, GA, USA Jun. 7-11, 1998, New York, NY USA, IEEE, US, Jun. 7, 1998, pp. 1817-1823, XP010284635, ISBN: 0-7803-4788-9.

Bar-Noy A. et al.: "Topology Distribution Cost Vs. Efficient Routing in Large Networks," Computer Communications Review, Association for Computing Machinery, New York, US, vol. 20, No. 4, Sep. 1, 1990, pp. 242-252, XP000168058; ISSN: 0146-4833, whole document.

International Search Rport in International Application No. PCT/US01/13694, dated Mar. 12, 2002, 7 pgs.

Fritz J: "Bullet Proofing ATM: Part I," Byte, McGraw-Hill Inc. St. Peterborough, US, vol. 22, No. 6, Jun. 1, 1997, pp. 59-60, XP000691556, ISSN: 0360-5280, p. 60.

Sun H. et al.: "Supporting IP on the ATM networks: an overview," Computer Communications, Elsevier Science Publishers BV, Amsterdam, NL, vol. 21, No. 11, Aug. 10, 1998, pp. 1020-1029, XP004138773, ISSN: 0140-3664, whole document.

Law A M et al: "Simulation Software for Communications Networks: The State of the Art," IEEE Communications Magazine, IEEE Service Center. Piscatatway, N.J., US, vol. 32, No. 3, Mar. 1, 1994, p. 1, col. 2, missing part see source paragraph 6; XP 000442186.

International Search Report in International Application No. PCT/US01/14615, dated Apr. 5, 2002, 7 pages.

International Preliminary Examination Report in International Applications No. PCT/US01/13725, dated Jun. 4, 2002, 5 pages.

International Preliminary Examination Report in International Application No. PCT/US01/13732, dated Jul. 12, 2005, 5 pages.

PCT International Search Report in International Application No. PCT/US 01/13695, dated Oct. 9, 2001, 6 pages.

Kermani, et al., "*Virtual Cut-through: A New Computer Communication Switching Technique*", Computer Networks, vol. 3, Cover, Table of Contents and pp. 267-285, 1979.

Cidon, et al., "*MetaRing—A Full Duplex Ring with Fairness and Spatial Reuse*", IEEE Transactions on Communications, vol. 41, Cover and pp. 110-120, Jan. 1993.

Ofek, et al., "*METANET: Principles of an Arbitrary Topology LAN*", IEEE Transactions on Networking, vol. 3, No. 2, Cover and pp. 169-180, Apr. 1995.

West, "*Introduction to Graph Theory*", Prentice Hall, ISBN 0-13-227828-6, QA 166.W43 1996, 7 pages Cover, ISBN page, Table of Contents, and pp. 51-85, 1996.

Hunter, et al., "*WASPNET: A Wavelength Switched Packet Network*", IEEE Communications Magazine, 2-page cover and pp. 120-129, Mar. 1999.

Hernandez-Valencia, "*A Simple Data Link (SDL) Framing Protocol for High-Speed Optical Packet Networks*", OIF99.043.0, pp. 1-21, May 4, 1999.

Simpson, "*The Point-to-Point Protocol (PPP)*", Daydreamer, RFC-1661, 50 pages, Jul. 1994.

Katz, et al., "*Traffic Engineering Extensions to OSPF*", IETF Draft, draft-katz-yeung-ospf-traffic-01.txt, pp. 1-8, Oct. 1999.

Crawley, et al., "*A Framework for Qos Based Routing in the Internet*", RFC 2386, 35 pages, Aug. 1998.

Wimer, et al., FORE Systems, Inc., "*OSPF Sub-Areas*", IETF Draft, draft-wimer-ospf-sub-areas-00.txt, 13 pages, Oct. 1999.

Wimer, et al., FORE Systems, Inc., "*Additional OSPF Extensions for Traffic Engineering and Qos Routing*", IETF Draft, draft-wimer-ospf-traffic-00.txt, 5 pages, Feb. 1999.

Yeung, "OSPF Extensions for Traffic Engineering", IETF Draft, draft-yeung-ospf-traffic-00.txt, 9 pages, Feb. 1999.
Apostolopoulos, et al., "Qos Routing Mechanism and OSPF Extensions", RFC 2676, 47 pages, Aug. 1998.
Smit, et al., "IS-IS Extensions for Traffic Engineering", IETF Draft, draft-ietf-isis-traffic-00.txt, 10 pages, May 1999.
Awduche, et al., UUNET (MCI WorldCom), "Requirements for Traffic Engineering Over MPLS", RFC 2702, 28 pages, Sep. 1999.
Blake, et al., "An Architecture for Differentiated Services", RFC 2475, 34 pages, Dec. 1998.
Braden, et al., "Resource ReSerVation Protocol (RSVP)". Version 1 Functional Specification, RFC 2205, 105 pages, Sep. 1997.
Wroclawski, "Specification of the Controlled-Load Network Element Service", RFC 2211, 18 pages, Sep. 1997.
Shenker, et al., "Specification of Guaranteed Quality of Service", RFC 2212, 19 pages, Sep. 1997.
Reynolds, et al., ISI, "Assigned Numbers", RFC 1700, 215 pages, Oct. 1994.
Jacobson, et al., "An Expedited Forwarding PHB", RFC 2598, 11 pages, Jun. 1999.
Heinanen, et al., "Assured Forwarding PHB Group", RFC 2597, 11 pages, Jun. 1999.
Manchester, et al., Bell Laboratories, "IP over SONET", IEEE Communications Magazine, vol. 36, No. 5, cover and pp. 136-142, May 1998.
Heinanen, Telecom Finland "Multi-Protocol Encapsulation over ATM Adaptation Layer 5", RFC 1483, 15 pages, Jul. 1993.
The ATM Forum, Technical Committee, "Private Network-Network Interface Specification Version 1.0", af-pnni-0055.000, cover, introduction, acknowledgements and table of contents (18 pages) and 366 pages of text, Mar. 1996.
Callon, Digital Equipment Corporation, "Use of OSI IS-IS for Routing in TCP/IP and Dual Environments", RFC 1195, 80 pages, Dec. 1990.
Moy, Ascend Communications "OSPF Version 2", RFC 2328, 204, Apr. 1998.
Malkin, Bay Networks, "RIP Version 2", RFC 2453, 37 pages, Nov. 1998.
Rekhter, et al., "A Border Gateway Protocol 4 (BGP-4)", RFC 1771, 54 pages, Mar. 1995.
Goguen, et al., "RSVP Label Allocation for Backup Tunnels", draft-swallow-rsvp-bypass-label-00.txt, IETF Document, 10 pages, Oct. 1999.
Callon, et al., "A Framework for MPLS", draft-ietf-mpls-framework-05.txt, IETF document, 69 pages, Sep. 1999.
Rosen, et al., "Multiprotocol Label Switching Architecture", draft-ietf-mpls-arch-06.txt, IETF Document, 62 pages, Feb. 1999.
Rosen, et al., "MPLS Label Stack Encoding", IETF document, draft-ietf-mpls-label-encaps-07.txt, 22 pages, Sep. 1999.
Andersson, et al., "LDP Specification", IETF document, draft-ietf-mpls-ldp-06.txt, 124 pages.
Jamoussi, Nortel Networks Corp., "Constraint-Based LSP Setup Using LDP", draft-ietf-mpls-cr-ldp-03.txt, IETF Document, pp. 1-39, Sep. 1999.
Guerin, "Qos Routing in Networks with Inaccurate Information: Theory and Algorithms", IEEE/ACM Transactions on Networking, vol. 7, No. 3, cover and pp. 350-364, Jun. 1999.
Parekh, et al., "A Generalized Processor Sharing Approach to Flow Control in Integrated Services Networks: The Single Node Case", IEEE Transactions on Networking, vol. 1, No. 3, cover and pp. 344-357, Jun. 1993.
Parekh, et al., "A Generalized Processor Sharing Approach to Flow Control in Integrated Services Networks: The Multiple Node Case", IEEE Transactions on Networking, vol. 2, No. 2, cover and pp. 137-150, Apr. 1994.
Golestani, "A Self-Clocked Fair Queuing Scheme for Broadband Applications", Proceedings of IEEE Infocom '94, Toronto, Ontario, Canada, cover and pp. 636-646, Jun. 1994.
Zhang, "Virtual Clock: A New Traffic Control Algorithm for Packet Switching Networks", ACM SIGCOMM Computer Communication Reviews, vol. 20, No. 4, pp. 19-29, Sep. 1990.

Ferrari, et al., "A Scheme for Real-Time Channel Establishment in Wide-Area Networks", IEEE Journal on Selected Areas in Communications, vol. 8, No. 3, cover and pp. 368-379, Apr. 1990.
Wrege, et al., "A Near-Optimal Packet Scheduler for QoS Networks", Proceedings of IEEE Infocom '97, Kobe, Japan, cover and pp. 576-583, Apr. 7-12, 1997.
Golestani, "A Stop-and-Go Queuing Framework for Congestion Management", ACM SIGCOMM Computer Communications Review, vol. 20, No. 4., pp. 8-18, Sep. 1990.
Kalmanek, et al., "Rate Controlled Servers for Very High-Speed Networks", Proceedings of IEEE Globecom '90, San Diego, CA, Conference Record vol. 1 of 3, cover and pp. 300.3.1-300.3.9, Dec. 2-5, 1990.
Sriram, K., "Methodologies for Bandwidth Allocation, Transmission, Scheduling and Congestion Avoidance in Broadband ATM Networks", Proceedings of IEEE Globecom, '92, Orlando, FL, Conference Record vol. 3 of 3, cover and pp. 1545-1551, Dec. 6-9, 1992.
Jacobson, et al., "Random Early Detection Gateways for Congestion Avoidance", ACM/IEEE Transactions on Networking, vol. 1, No. 4, cover and pp. 397-413, Aug. 1993.
Braden, et al., "Recommendations on Queue Management and Congestion Avoidance in the Internet", RFC 2309, 16 pages, Apr. 1998.
Jacobson, "Notes on Using RED for Queue Management and Congestion Avoidance", Network Research Group, Berkeley National Laboratory, Berkeley, CA, NANOG 13, Dearborn, MI, cover and 15 pages, Jun. 8, 1998.
May, et al., "Analytic Evaluation of RED Performance", pp. 1-10, Jun. 1998.
May, et al., "Reasons Not To Deploy RED", pp. 1-5, May 1999.
Lakshman, et al., "SRED: Stabilized RED", pp. 1-10, Mar. 1999.
Feng, et al., "BLUE: A New Class of Active Queue Management Algorithms", pp. 1-27, Mar. 1999.
Cisco's "Distributed Weighted Random Early Detection", Source = http://www.cisco.com/univercdcc/td/doc/product/software/ios111/cc111/wred.htm#xtocid236360, 17 pages, Feb. 9, 1998.
J. Wroclawski, MIT LCS "The Use of RSVP with IETF Integrated Services", RFC 2210, 31 pages, Sep. 1997.
Shenker, et al., "General Characterization Parameters for Integrated Service Network Elements"RFC 2215, 15 pages, Sep. 1997.
Braden, et al., "RAPI—An RSVP Application Programming Interface, Version 5", Internet Draft, 25 pages, Aug. 11, 1998.
Katsube, et al., "Toshiba's Router Architecture Extensions for ATM: Overview", RFC 2098, 17 pages, Feb. 1997.
Rekhter, et al., "Cisco Systems' Tag Switching Architecture Overview", RFC 2105, 13 pages, Feb. 1997.
Viswanathan, et al., "ARIS: Aggregate Route-Based IP Switching", Internet draft, 19 pages, Mar. 1997.
Newman, et al., "Ipsilon Flow Management Protocol Specification for IPv4 Version 1.0", RFC 1953, 19 pages, May 1996.
Davie, et al., "Switching in IP Networks", ISBN 1-558650-505-3, TK5105.875.157,D38, Morgan Kaufmann Publishers, Inc., San Francisco, CA, 8 pgs. cover, ISBN page, table of contents, pp. 27-55, 117-154, 219-232, 1998.
Moy, Proteon, Inc., "OSPF Version 2", RFC 1583, 202 pages, Mar. 1994.
Kastenholz, FTP Software, Inc., "The Definitions of Managed Objects for the IP Network Control Protocol of the Point-to-Point Protocol", RFC 1473, 10 pages, Jun. 1993.
Baker, Cisco Systems, "IP Forwarding Table MIB", RFC 2096, 20 pages, Jan. 1997.
Awduche, et al., draft-ietf-tewg-framework-01.txt (IETF), "A Framework for Internet Traffic Engineering", 63 pages, Jul. 2000.
U.S. Appl. No. 09/588,634, entitled "Method and System for Providing a Protection Path for Connection-Oriented Signals in a Telecommuncations Network", inventors Mo, et al., 32 pages specification, claims and abstract and 3 pages of drawings, Jun. 6, 2000.
U.S. Appl. No. 09/588,806, entitled "Transport Network and Method", inventors Mo, et al., 40 pages specification, claims and abstract and 9 pages of drawings, Jun. 6, 2000.

U.S. Appl. No. 09/588,636, entitled *"Method and System for Transporting Traffic in a Packet-Switched Network"*, inventors Mo, et al., 32 pages specification, claims and abstract and 6 pages if drawings, Jun. 6, 2000.

U.S. Appl. No. 09/588,632, entitled *"System and Method Connectionless/Connection Oriented Signal Transport"*, inventors Mo, et al., 44 pages specification, claims and abstract and 7 pages of drawings, Jun. 6, 2000.

U.S. Appl. No. 09/848,994, entitled *"Method and System for Quality of Services (QoS) Support in a Packet-Switched Network"*, inventors Li Mo, et al., 35 pages specification, claims and abstract and 6 pages of drawings, May 4, 2001.

U.S. Appl. No. 09/848,871, entitled *"Method and System for Modeling and Advertising Asymmetric Topology of a Node in a Transport Network"*, inventors Jaber, et al., 35 pages specification, claims and abstract and 10 pages of drawings, May 4, 2001.

U.S. Appl. No. 09/849,003, entitled *"Unique Address Space and Method for a Transport Network"*, inventor Edwin Alton Harbin, 36 pages specification, claims and abstract and 10 pages of drawings, May 4, 2001.

U.S. Appl. No. 09/849,010, entitled *"Method and Systems for Hardware Simulation"*, inventors Richard L. Klevans, et al., 28 pages specification, claims and abstract and 7 pages of drawings, May 4, 2001.

\* cited by examiner

METHOD AND SYSTEM FOR PROVIDING A PROTECTION PATH FOR CONNECTIONLESS SIGNALS IN A TELECOMMUNICATIONS NETWORK

RELATED APPLICATIONS

This application claims the benefit of U.S. Provisional Application Ser. No. 60/202,190, entitled INTERNET PROTOCOL TRANSPORT, filed May 5, 2000 which is hereby incorporated by reference.

TECHNICAL FIELD OF THE INVENTION

This invention relates generally to the field of telecommunications and more particularly to a method and system for providing a protection path for connectionless signals in a telecommunications network.

BACKGROUND OF THE INVENTION

Telecommunications systems generally operate in either a connection-oriented mode or a connectionless mode. In a connectionless mode of operation, signals are communicated with less regard for the particular path traversed between source and destination and network elements than in a connection-oriented mode. Connectionless signaling typically focuses on the destination address, or other identification, rather than any particular path between source and destination network elements. Internet Protocol (IP), IPx, and SNA packet switching are examples of connectionless signal transport.

When a failure occurs along the working path being traversed by signals in connectionless communication, the signals must be re-routed to the destination network element along another available path. In conventional telecommunications systems, this re-routing is done by each individual network element with no pre-defined protection paths existing for the connectionless signals. Thus, these systems are inefficient. In addition, bandwidth is wasted by these systems due to inefficient bandwidth reservation schemes.

SUMMARY OF THE INVENTION

In accordance with the present invention, a method and system for providing a protection path for connectionless signals in a telecommunications network are provided that substantially eliminate or reduce disadvantages and problems associated with previously developed systems and methods. In particular, protection paths are pre-defined for connectionless signals, thereby increasing network efficiency.

In one embodiment of the present invention, a method is provided for providing protection for connectionless signals in a telecommunications network comprising a plurality of nodes. A first protection path is generated from each of the nodes to a destination node. A second protection path is generated from each of the nodes to the destination node. The second protection path is distinct from the first protection path. Protection traffic is routed along one of the protection paths to the destination node.

In another embodiment of the present invention, a node is provided in a telecommunications network. The node includes at least two ports and a protection egress port identifier. Each of the ports is operable to receive and transmit traffic for the node. The protection egress port identifier is operable to identify one of the ports as a protection egress port for a specified ingress port and a specified destination node. The protection egress port is operable to transmit protection traffic received at the specified ingress port for the specified destination node.

Technical advantages of the present invention include providing a method for providing a protection path for connectionless signals in a telecommunications network. In particular, two protection paths are provided from each node to each destination node. Accordingly, each node may communicate with each other node along two distinct protection paths. As a result, the network is protected against a single failure. In addition, network efficiency is improved through the use of the pre-defined protection paths.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
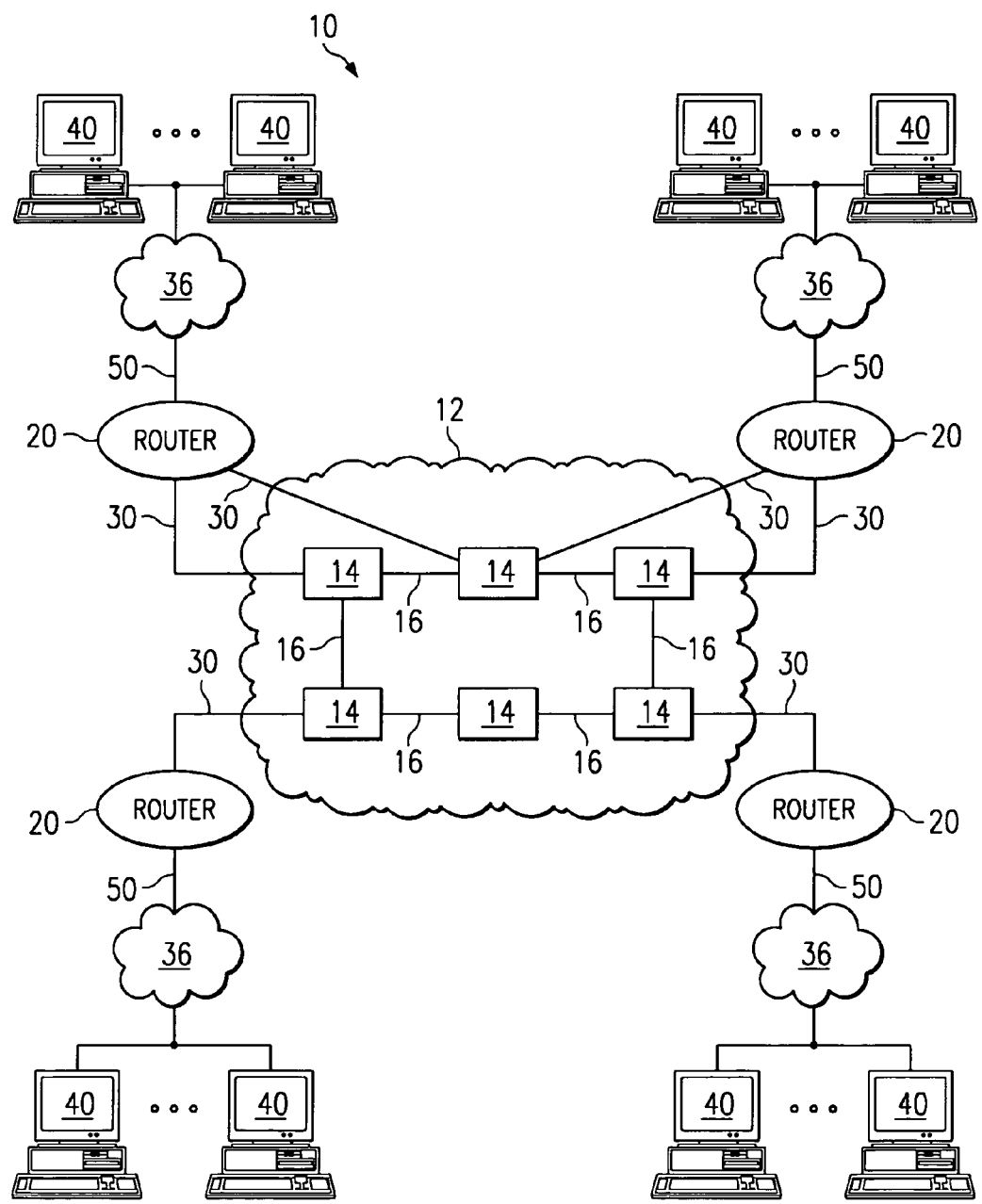
FIG. 1 is a block diagram illustrating a communication system operable to facilitate communication of connectionless signals in accordance with one embodiment of the present invention.

FIG. 1 is a block diagram illustrating a communication system 10 operable to facilitate communication of connectionless signals in accordance with one embodiment of the present invention. The telecommunications network is a network that transmits voice, audio, video or other suitable types of information, and/or a combination of different types of information between source and destination points. As used herein, the term "connectionless signal" refers to a signal that is not necessarily associated with any particular path from a source network element to a destination network element. In connectionless signaling, routing determinations, such as a determination of the next network element in the path, are generally made at each node in the path. Thus, each node independently identifies the next node in the forwarding chain. Connectionless signals include, for example, Internet Protocol (IP), IPx, SNA and other packet-switched transport signals.

The system 10 is operable to provide either connectionless communication or a hybrid of connectionless and connection-oriented communication, as described in the co-owned U.S. patent application entitled, "System and Method for Connectionless/Connection Oriented Signal Transport," filed on Jun. 6, 2000. The system 10 comprises a core cloud 12 that comprises one or more core network elements 14, or nodes 14. The nodes 14 may communicate with each other via communication links 16 and with one or more peripheral network elements 20 via communication links 30. The communication links 16 and 30 may comprise any wireless, wireline, fiber or other communication medium or combinations of media. A signal communicated via communication links 16 and/or 30 may comprise an electrical signal, an optical signal, or any other suitable type of signal or combination of signals.

The peripheral network elements 20 facilitate communication between the core cloud 12 and other network elements coupled to other networks, such as networks 36. According to the illustrated embodiment, the peripheral network elements 20 comprise routers 20. Each router 20 couples the core cloud 12 to a network 36 via a communication link 50. As used herein, "each" means every one of at least a subset of the identified items.

The routers 20 facilitate routing functions for signals originated or forwarded by interface equipment 40 and communicated over the networks 36. The interface units 40 comprise personal computers, servers, switches, routers or any other suitable network equipment operable to originate or forward communication signals.

The networks 36 may comprise any suitable wireline or wireless systems that support communication between network elements using ground-based and/or space-based components. For example, the networks 36 may comprise public switched telephone networks, integrated services digital networks, local area networks, wide area networks, or any other suitable communication system or combination of communication systems at one or more locations. Each of the networks 36 may comprise a single network or multiple networks.

In operation, the core cloud 12 receives connectionless signals from the routers 20 and routes those signals through the core cloud 12 to another appropriate router 20 according to routing rules associated with the received signal. In a particular embodiment, an ingress node 14 receives an incoming signal from a router 20 and appends a transport label to the incoming signal which contains instructions or an index to instructions to other nodes 14 on how to process the signal.

The ingress node 14 identifies an egress node 14 associated with a destination router 20 and communicates the signal toward the egress node 14. Nodes 14 residing between the ingress node and the egress node 14 receive the signal with the appended transport label and process the signal in accordance with the transport label.

Figure 2:
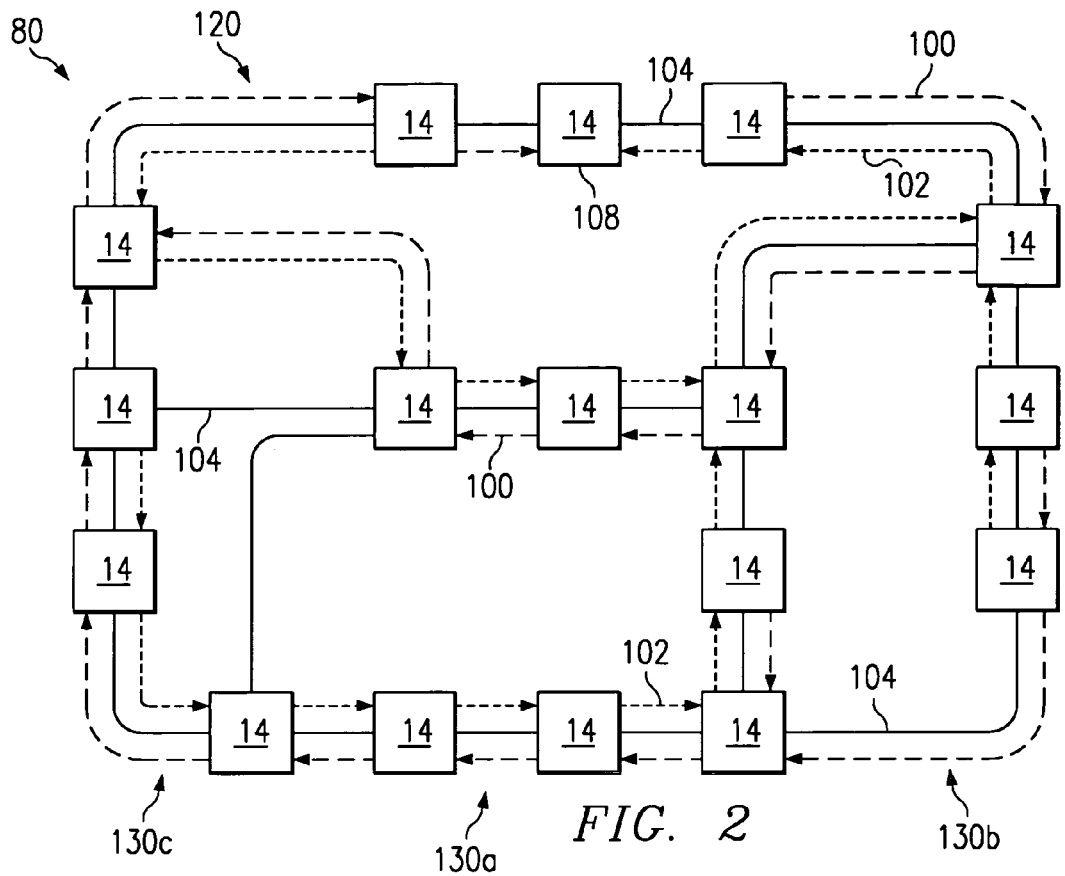
FIG. 2 is a block diagram illustrating a system for providing protection for connectionless signals communicated between the nodes of FIG. 1 in accordance with one embodiment of the present invention.

FIG. 2 is a block diagram illustrating a system 80 for providing protection for connectionless signals communicated between the nodes 14 in accordance with one embodiment of the present invention. Protection is provided by two protection paths 100 and 102. According to one embodiment, a protection path 100 or 102 comprises reserved bandwidth that is available for protection traffic.

In the illustrated embodiment, a plurality of nodes 14 are operable to communicate connectionless signals to and from each other over a working path 104 which provides a shortest distance path between source and destination nodes 14. In order to provide protection for these connectionless signals, a blue protection path 100, indicated by a dashed line, and a red protection path 102, indicated by a dotted line, are generated such that each node 14 may communicate with each other node 14 along two distinct protection paths 100 and 102. Thus, each node 14 comprises at least two ports: a blue port for transmitting traffic along the blue protection path 100 and a red port for transmitting traffic along the red protection path 102. As illustrated in FIG. 2, a destination node 108 may be reached by any other node 14 by following either the blue protection path 100 or the red protection path 102 from the other node 14.

In order to provide protection with these protection paths 100 and 102, a network must be protectable. The following notation will be used in determining whether or not a network is protectable. A graph G with n vertices, or nodes, and m edges, or links, has a vertex set V(G) and an edge set E(G). The count of the set V(G) is expressed as C(V(G)), which is equivalent to the number of nodes 14 inside the network. A network is protectable against a single fault if for all x,y in the set G there are two distinct paths inside G. This is the case for any network for which an ear decomposition, as described below, is possible.

A path addition to graph G is the addition to G of a path of length $l \geq 1$ between two vertices of G, introducing l−1 new vertices. This added path is referred to as an ear. An ear decomposition is a partition of the graph G into sets $P_0, \ldots, P_k$ such that $C=P_0$ is a cycle and $P_i$ for i−1 is an ear, or path addition, to the graph G formed by $P_0 \cup \ldots \cup P_{i-1}$.

Thus, for each node 14 in a protectable network, there are two distinct paths 100 and 102 to reach any other node 14 in the network. The paths 100 and 102 are distinct in that they share no common nodes 14 or links. Using the ear decomposition previously described, the protectable network may be decomposed into a ring 120 and a set of ears 130. In accordance with one embodiment, each node 14 in the network performs the ear decomposition in the same manner to arrive at the same result. It will be understood, however, that any suitable decomposition of the network may be performed by the nodes to arrive at a same result without departing from the scope of the present invention.

The ring 120 forms the initial part of the protectable network and is denoted by $P_0$. The first ear 130a comprises a set of nodes 14 coupled in a linear fashion with two links coupled to two different nodes 14 in the ring 120. The first ear 130a is denoted as $P_1$. The second ear 130b is a set of nodes 14 coupled to two different nodes 14 in either $P_0$ or $P_1$. Although the illustrated embodiment comprises three ears 130a, b and c, it will be understood that an ear decomposition of a protectable network may result in any suitable number of ears 130.

Figure 3:
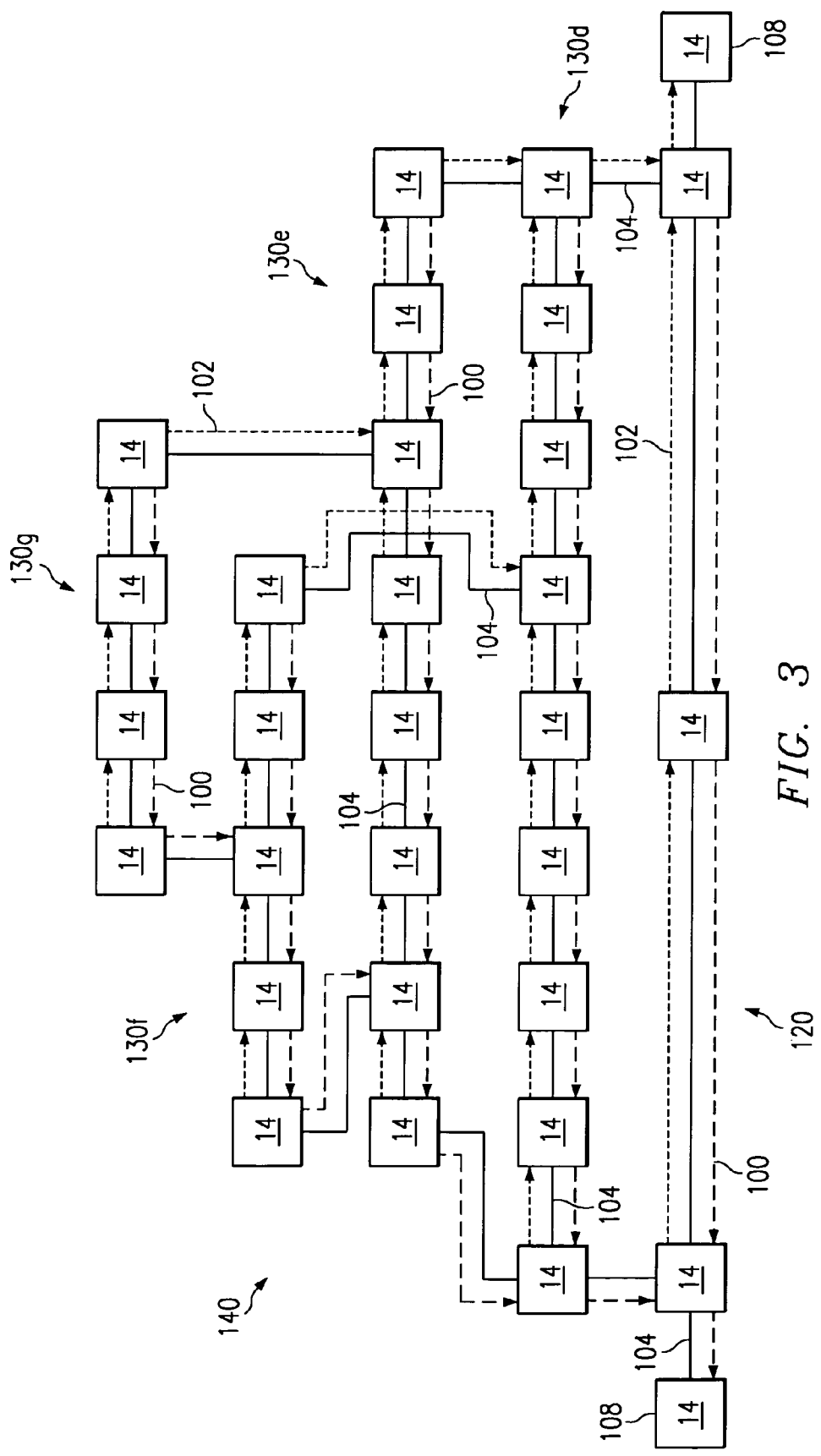
FIG. 3 is a block diagram illustrating a system for generating the protection paths of FIG. 2 in accordance with one embodiment of the present invention.

FIG. 3 is a block diagram illustrating a system 140 for generating the protection paths 100 and 102 for connectionless signals communicated between the nodes 14 in accordance with one embodiment of the present invention. After a protectable network has been decomposed through an ear decomposition, the protection paths 100 and 102 are generated as described in connection with FIG. 3.

The ring 120 is split open at the destination node 108 and charted horizontally, beginning and ending with the same destination node 108. Beginning with the leftmost destination node 108, the first ear 130d is identified based on a minimum hop count to the destination node 108. This ear 130d is denoted as $P_1$ and is charted horizontally above the ring 120.

Any other ears 130, such as ears 130e, f and g, are identified in a similar manner and charted horizontally above the previous ear 130. After charting the ring 120 and the ears 130, the blue protection path 100 is generated from right to left on the chart and the red protection path 102 is generated from left to right on the chart. Thus, from any node 14, the protection paths 100 and 102 to the destination node 108 do not intersect, resulting in a network which is protected from any single failure.

Figure 4:
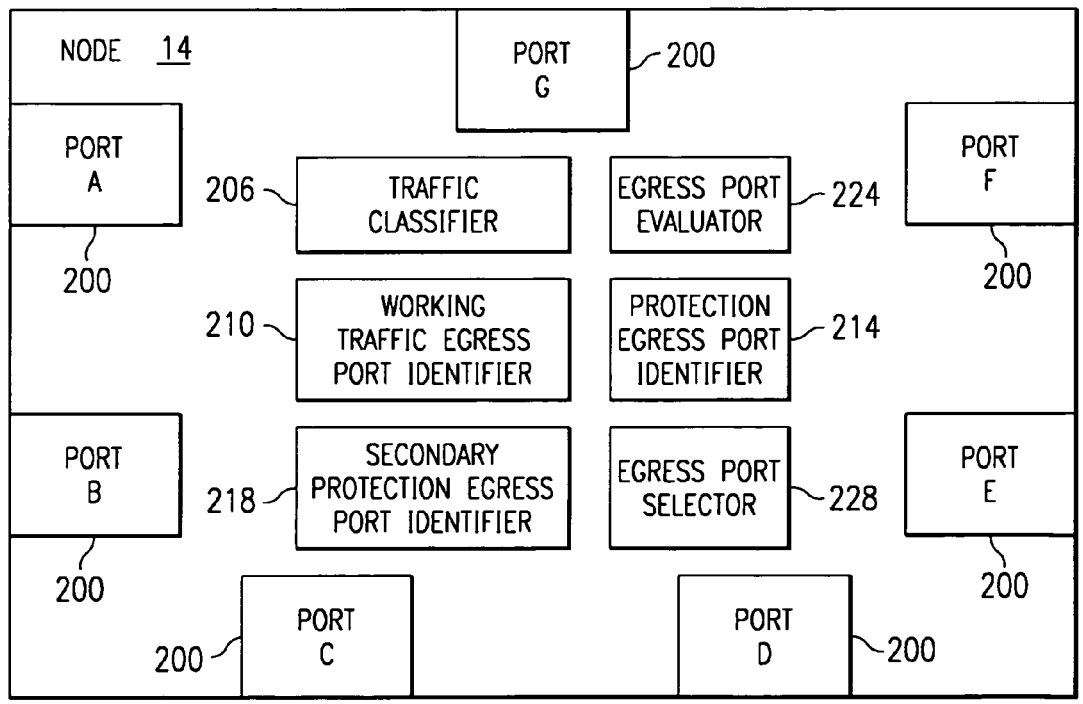
FIG. 4 is a block diagram illustrating one of the nodes of FIGS. 1, 2 and 3 operable to provide protection for connectionless signals in accordance with one embodiment of the present invention.

FIG. 4 is a block diagram illustrating one of the nodes 14 operable to provide protection for connectionless signals in accordance with one embodiment of the present invention. The node 14 comprises a plurality of ports 200, each of which is operable to receive traffic from and transmit traffic to other nodes 14 in the network. Although the illustrated embodiment comprises seven ports 200, it will be understood that any suitable number of ports 200 greater than one may be implemented in the node 14 without departing from the scope of the present invention.

The node 14 also comprises a traffic classifier 206 for classifying traffic received through ports 200 as either working traffic or protection traffic, a working traffic egress port identifier 210 for identifying an egress port 200 for working traffic, a protection egress port identifier 214 for identifying an egress port 200 for protection traffic, a secondary protection egress port identifier 218 for identifying an egress port 200 for protection traffic, an egress port evaluator 224 for evaluating the status of an egress port 200, and an egress port selector 228 for selecting an appropriate egress port 200 and, in certain situations, discarding traffic.

The traffic classifier 206 is operable to classify traffic received through the ports 200 as either working traffic or protection traffic. According to one embodiment, the traffic comprises a traffic identifier identifying itself as either working traffic or protection traffic. For example, the traffic identifier may comprise a specified bit in the traffic, with one value for the bit indicating working traffic and another value for the bit indicating protection traffic. The traffic classifier 206 is then operable to classify the received traffic based on the traffic identifier for the traffic. It will be understood that the traffic classifier 206 may classify the traffic as working or protection traffic in any other suitable manner without departing from the scope of the present invention.

The working traffic egress port identifier 210 identifies an egress port 200 for working traffic received at any one of the ports 200 for the node 14 based on the corresponding destination node for the traffic. Thus, the working traffic egress port identifier 210 may comprise a database, table or other suitable data store for identifying a particular port 200 as an egress port for working traffic received at the node 14 based on the destination node for the working traffic. For example, for working traffic received at the node 14 having a particular destination node, the working traffic egress port identifier 210 may identify port F 200 as the egress port 200 for that traffic. For another destination node, the working traffic egress port identifier 210 may identify port C 200 as the egress port 200.

The protection egress port identifier 214 is operable to identify an egress port 200 for protection traffic received at any other port 200 in the node 14 bound for a particular destination node. Thus, the protection egress port identifier 214 may comprise a database, table or other suitable data store for identifying a particular port 200 as an egress port for protection traffic received at the node 14 based on a particular ingress port 200 in conjunction with the destination node for the protection traffic. For example, for protection traffic received at port B 200 having a particular destination node, the protection traffic egress port identifier 214 may identify port D 200 as the egress port 200 for that traffic. For protection traffic received at port B 200 having a different destination node, the protection traffic egress port identifier 214 may identify port E 200 as the egress port 200 for that traffic.

The secondary protection egress port identifier 218 is operable to identify an egress port 200 for transmitting traffic received at another port 200 in the node 14 for a particular destination node. Thus, the secondary protection egress port identifier 218 may comprise a database, table or other suitable data store for identifying a particular port 200 as an egress port for transmitting protection traffic based on working traffic received at the node 14 having a particular destination node. For example, for working traffic received at the node 14 having a particular destination node and for which the working traffic egress port 200 identified by the working traffic egress port identifier 210 is unavailable, the secondary protection egress port identifier 218 may identify port G 200 as the egress port 200 for that traffic. Thus, for a particular destination node, the secondary protection egress port identifier 218 identifies one egress port 200.

The egress port evaluator 224 is operable to evaluate the status of an egress port 200 in order to determine whether the port 200 is available or unavailable. The status for a port 200 is available when the port 200 is functioning properly, while the status is unavailable when the port 200 is not functioning properly. According to one embodiment, each port 200 for the node 14 provides a status to the egress port evaluator 224. Alternatively, the egress port evaluator 224 may test the ports 200 to determine status or may request a status from the ports 200. It will be understood that the egress port evaluator 224 may obtain the status of the egress ports 200 in any suitable manner without departing from the scope of the present invention.

The egress port selector 228 is operable to select an appropriate egress port 200 and to discard traffic for which no appropriate egress port 200 is available. Thus, the egress port selector 228 may retrieve information from the traffic classifier 206, the egress port evaluator 224, and one or more of the working traffic egress port identifier 210, protection egress port identifier 214, and secondary protection egress port identifier 218 in order to select the appropriate egress port 200 for a given situation.

In operation, the traffic classifier 206, the working traffic egress port identifier 210, the protection egress port identifier 214, the secondary protection egress port identifier 218, the egress port evaluator 224 and the egress port selector 228 operate together to route traffic from a particular ingress port 200 to the appropriate egress port 200 for the node 14. The working traffic egress port 200 identified by the working traffic egress port identifier 210 is selected by the egress port selector 228 for received working traffic that is being forwarded along the working path 104. The protection egress port 200 identified by the protection egress port identifier 214 is selected by the egress port selector 228 for received protection traffic that is being forwarded along a protection path 100 or 102. The secondary protection egress port 200 identified by the secondary protection egress port identifier 218 is selected by the egress port selector 228 for traffic received on the working path 104, but that is being transmitted onto a protection path 100 or 102.

The egress port selector 228 is operable to select an egress port 200 based on traffic classification and on port status. If the traffic classifier 206 has classified the received traffic as protection traffic, the egress port selector 228 provides the protection egress port 200 identified by the protection egress port identifier 214 to the egress port evaluator 224 for status evaluation. If the protection egress port status is available, the egress port selector 228 selects the protection egress port 200 as the egress port 200 for the corresponding traffic. However, if the protection egress port status is unavailable, the egress port selector 228 discards the corresponding traffic.

If the traffic classifier 206 has classified the received traffic as working traffic, the egress port selector 228 provides the working traffic egress port 200 identified by the working traffic egress port identifier 210 to the egress port evaluator 224 for status evaluation. If the working traffic egress port status is available, the egress port selector 228 selects the working traffic egress port 200 as the egress port 200 for the corresponding traffic. However, if the working traffic egress port status is unavailable, the secondary protection egress port 200 identified by the secondary protection egress port identifier 218 is provided by the egress port selector 228 to the egress port evaluator 224 for status evaluation.

If the secondary protection egress port status is available, the egress port selector 228 selects the secondary protection egress port 200 as the egress port 200 for the corresponding traffic. However, if the secondary protection egress port status is unavailable, the egress port selector 228 discards the corresponding traffic.

Thus, for received working traffic with an available corresponding working traffic egress port 200, the traffic is transmitted by the working traffic egress port 200 along the working path 104. Similarly, for protection traffic with an available protection egress port 200, the traffic is transmitted by the protection egress port 200 along the protection path 100 or 102 on which the traffic was received. For received working traffic with an unavailable working traffic egress port 200, the traffic is transmitted onto a protection path 100 or 102 by the secondary protection egress port 200, if available. Thus, this traffic is re-routed from the working path 104 to the protection path 100 or 102 having the shortest distance to the destination node. In addition, the traffic identifier for the traffic is changed to indicate that the traffic is now protection traffic as opposed to working traffic.

Figure 5:
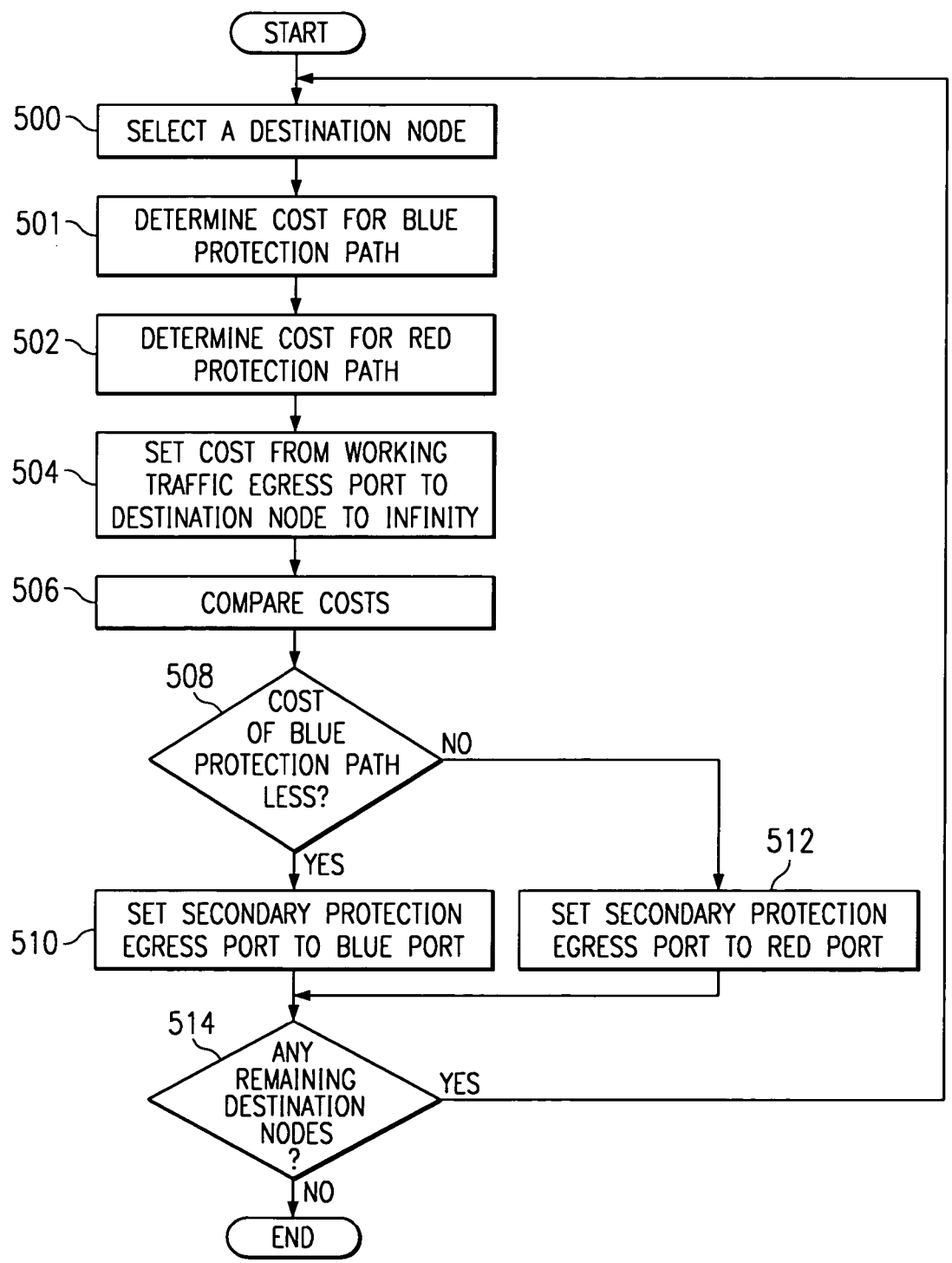
FIG. 5 is a flow diagram illustrating a method for assigning a secondary protection egress port for the node of FIG. 4 for each of a plurality of destination nodes.

FIG. 5 is a flow diagram illustrating a method for assigning a secondary protection egress port for a particular node 14, referred to as node β, for each of a plurality of destination nodes 64. The method begins at step 500 where a selection is made of a destination node 64 whose secondary protection egress port for node β has not been assigned. At step 501, a cost is determined for the blue protection path 100 based on the distance from the blue port for node β to the destination node. At step 502, a cost is determined for the red protection path 102 based on the distance from the red port for node β to the destination node. At step 504 the cost from the working traffic egress port 200 to the destination node is set to infinity. Thus, for the situation in which either the blue port or the red port comprises the working traffic egress port 200, the cost for the corresponding protection path 100 or 102 is infinity.

At step 506, the costs of the protection paths 100 and 102 are compared. At decisional step 508, a determination is made regarding whether the cost of the blue protection path 100 is less than the cost of the red protection path 102. If the cost of the blue protection path 100 is less than the cost of the red protection path 102, the method follows the Yes branch from decisional step 508 to step 510. At step 510, the secondary protection egress port 200 for node β for the selected destination node is set to the blue port.

Returning to decisional step 508, if the cost of the blue protection path 100 is not less than the cost of the red protection path 102, the method follows the No branch from decisional step 508 to step 512. At step 512, the secondary protection egress port 200 for node β for the selected destination node is set to the red port.

From steps 510 and 512, the method continues to decisional step 514. At decisional step 514, a determination is made regarding whether any destination nodes 64 remain whose secondary protection egress port for node β has not been assigned. If destination nodes 64 remain whose secondary protection egress port for node β has not been assigned, the method follows the Yes branch from decisional step 514 and returns to step 500 for the selection of another destination node 64. However, if no destination node 64 remains whose secondary protection egress port for node β has not been assigned, the method follows No branch from decisional step 514 and comes to an end.

Figure 6A:
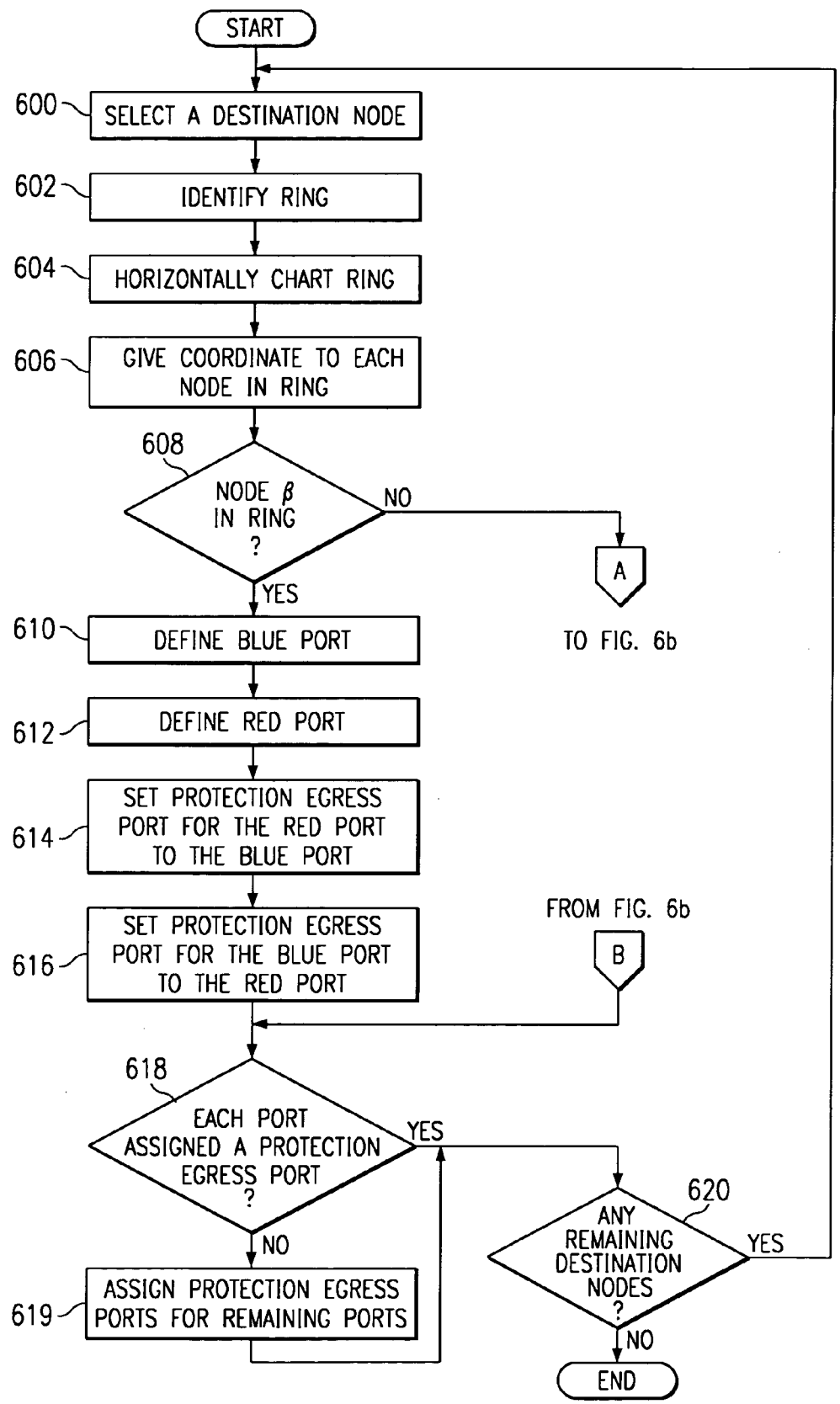
FIG. 6 is a flow diagram illustrating a method for assigning a protection egress port for each port for the node of FIG. 4 for each of a plurality of destination nodes.
Figure 6B:
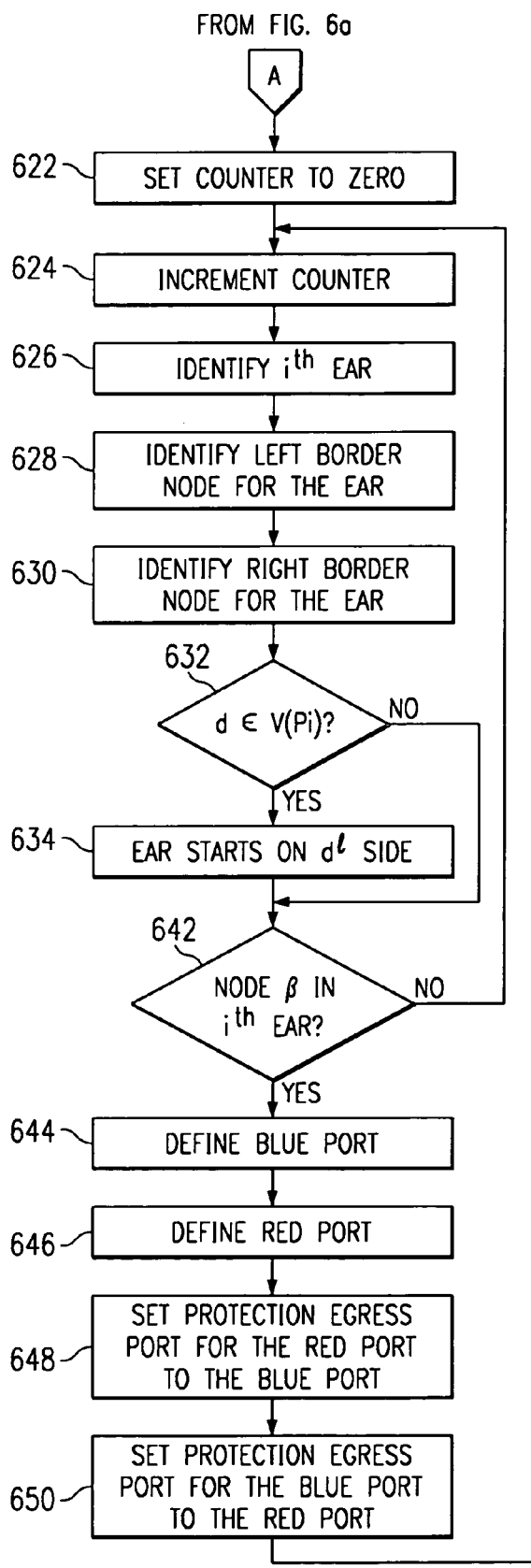
Figure 6B:
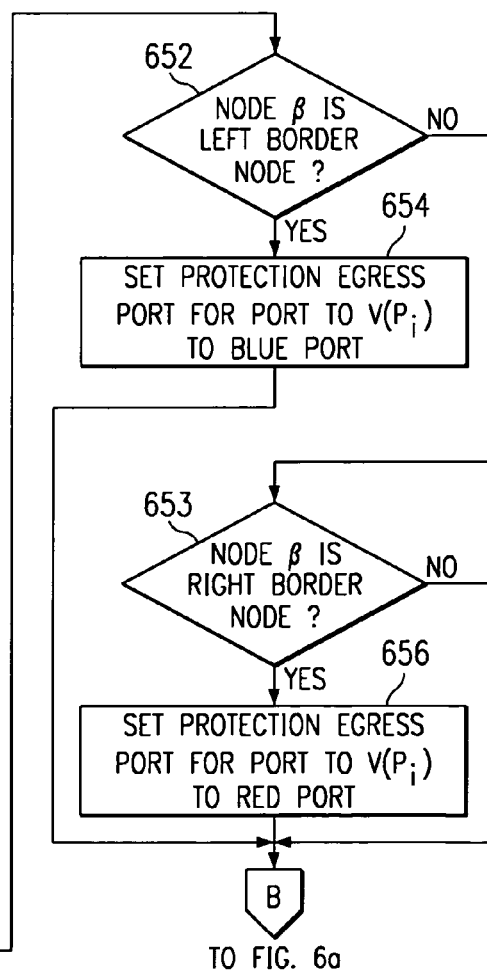

FIG. 6 is a flow diagram illustrating a method for assigning a protection egress port for each port 200 for a particular node 14, referred to as node β, for each of a plurality of destination nodes 64. The method begins at step 600 where a selection is made of a destination node 64 whose protection egress ports for node β have not been assigned. This destination node 64 is denoted as d. At step 602, the ring 120 of the ear decomposition, $P_0$, is identified by determining which ring (i) has the largest nodal count, $C(V(P_0))$, among all the possible decompositions and (ii) has the largest node ID for the nodes 14 in $\overline{\{d\}} \cap V(P_0)$. Each node 14 has a corresponding node ID. The largest node ID is used to select a single ring 120 from multiple possible rings which each have the same nodal count. The ring 120 starts and ends with the destination node d 64.

At step 604, the ring 120 is charted horizontally on a graph. Because the destination node d 64 is included twice, at the beginning and end of the ring 120, the destination node d 64 has two coordinates on the graph. The left coordinate, which is expressed as $X(d^l)$ is zero, while the right coordinate, which is expressed as $X(d^r)$, is $\alpha$ (a value greater than zero).

At step 606, each node 14 in the ring 120 is given a coordinate. Starting from the $d^l$ side, the $j^{th}$ node in $P_0$, denoted as $n_{P_0,j}$ will have a coordinate given by:

$$X(n_{P0,j}) = \frac{j \times \alpha}{C(P_0)} \text{ with } j = 0, \ldots, C(P_0) - 1 \qquad \text{(eqn.1)}$$

At decisional step 608, a determination is made regarding whether node β is in the ring 120. If node β is in the ring 120, the method follows the Yes branch from decisional step 608 to step 610. At step 610, a blue port for node β is defined as the port 200 linked to node $n_{P_0,b} \in V(P_0)$ with coordinate $X(n_{P_0,b}) < X(\beta)$. At step 612, a red port for node β is defined as the port 200 linked to node $n_{P_0,r} \in V(P_0)$ with coordinate $X(n_{P_0,r}) > X(\beta)$ At step 614, the protection egress port for the red port is set to the blue port. At step 616, the protection egress port for the blue port is set to the red port.

At decisional step 618, a determination is made regarding whether each port 200 of node β has been assigned a corresponding protection egress port for the destination node d 64. If each port 200 of node β has been assigned a corresponding protection egress port for the destination node d 64, the method follows the Yes branch from decisional step 618 to decisional step 620.

At decisional step 620, a determination is made regarding whether any destination nodes d 64 remain whose protection egress ports for node β have not been assigned. If destination nodes d 64 remain whose protection egress ports for node β have not been assigned, the method follows the Yes branch from decisional step 620 and returns to step 600 for the selection of another destination node d 64. However, if no destination nodes D 64 remain whose protection egress ports for node β have not been assigned, the method follows the No branch from decisional step 620 and comes to an end.

Returning to decisional step 618, if each port of node β has not been assigned a corresponding protection egress port for the destination node d 64, the method follows the No branch from decisional step 618 to step 619. At step 619, protection egress ports are assigned for the remaining ports 200 of node β.

Returning to decisional step 608, if node β is not in the ring 120, the method follows the No branch from decisional step 608 to step 622. At step 622, a counter, i, is set to zero. At step 624, the counter, i, is incremented by one.

At step 626, the $i^{th}$ ear 130 of the ear decomposition, $P_i$, is identified by determining which ear (i) has the largest nodal count, $C(V(P_i))$, among all the possible decompositions and (ii) has the largest node ID, $x_{max}$, among the nodes 14 in $\overline{V(P_0 \cup ... \cup P_{i-1})}$. The largest node ID is used to select a single ear from multiple possible ears which each have the same nodal count.

At step 628, a left border node, $e_i^l$, is identified for the ear $P_i$ 130 in the set $V(P_i) \cap V(P_0 \cup ... \cup P_{i-1})$. At step 630, a right border node, $e_i^r$, is identified for the ear $P_i$ 130 in the set $V(P_i) \cap V(P_0 \cup ... \cup P_{i-1})$.

At decisional step 632, a determination is made regarding whether $d \in V(P_i)$. If $d \in V(P_i)$, the method follows the Yes branch from decisional step 632 to step 634. At step 634, the ear 130 starts on the $d^l$ side, with $X(e_i^l) = X(d^l) = 0$. The ear 130 may also end with the destination node d 64 on the $d^r$ side. This is the case when $e_i^l = e_i^r = d$. The nodes $e_i^l$ and $e_i^r$ are selected so that $X(e_i^l) < X(e_i^r)$.

Returning to decisional step 632, if $d \notin V(P_i)$, the method follows the No branch from decisional step 632 to decisional step 642. At step decisional step 642, a determination is made regarding whether node β is in $V(P_i)$. If node β is in $V(P_i)$, the method follows the Yes branch from decisional step 642 to step 644. If node β is not in $V(P_i)$, the method follows the No branch from decisional step 642 and returns to step 624 where the counter is incremented and the method continues until node β is in $V(P_i)$.

At step 644, the blue port of node β is defined as the port 200 linked to node $n_{Pi,b} \in V(P_i)$, with coordinate $X(n_{Pi,b}) < X(\beta)$. At step 646, the red port of node β is defined as the port 200 linked to node $n_{Pi,r} \in V(P_i)$, with coordinate $X(n_{Pi,r}) > X(\beta)$. At step 648, the protection egress port for the red port is set to the blue port. At step 650, the protection egress port for the blue port is set to the red port.

At decisional step 652, a determination is made regarding whether node β is the left border node. If node β is the left border node, the method follows the Yes branch from decisional step 652 to step 654. At step 654, the protection egress port for the port 200 of node β leading to other nodes 14 in $V(P_i)$ is set to the blue port.

Returning to decisional step 652, if node β is not the left border node, the method follows the No branch from decisional step 652 to decisional step 653. At decisional step 653, a determination is made regarding whether node β is the right border node. If node β is the right border node, the method follows the Yes branch from decisional step 653 to step 656. At step 656, the protection egress port for the port 200 of node β leading to other nodes 14 in $V(P_i)$ is set to the red port. Returning to decisional step 653, if node β is not the right border node, the method follows the No branch from decisional step 653 and returns to decisional step 618.

According to one embodiment, the coordinates for each $V(P_i)$ are made unique. For this embodiment, the coordinates of the $j^{th}$ node from $e_i^l$, denoted as $n_{Pi,j}$ with j>0, are assigned to:

$$X(n_{Pi,j}) = X(e_i^l) + \frac{M_i - X(e_i^l)}{C(P_i) - 1} \times j, \quad \text{(eqn.2)}$$

with $j = 1, ..., C(P_i) - 2$ $$M_i = \min_{n \in V(P_0 \cup ... \cup P_{i-1})} \{X(n), X(e_i^l) > X(n)\} \quad \text{(eqn. 3)}$$

where $M_i$ is the smallest coordinate in $V(P_0 \cup ... \cup P_{i-1})$ which is larger than $X(e_i^l)$.

Figure 7:
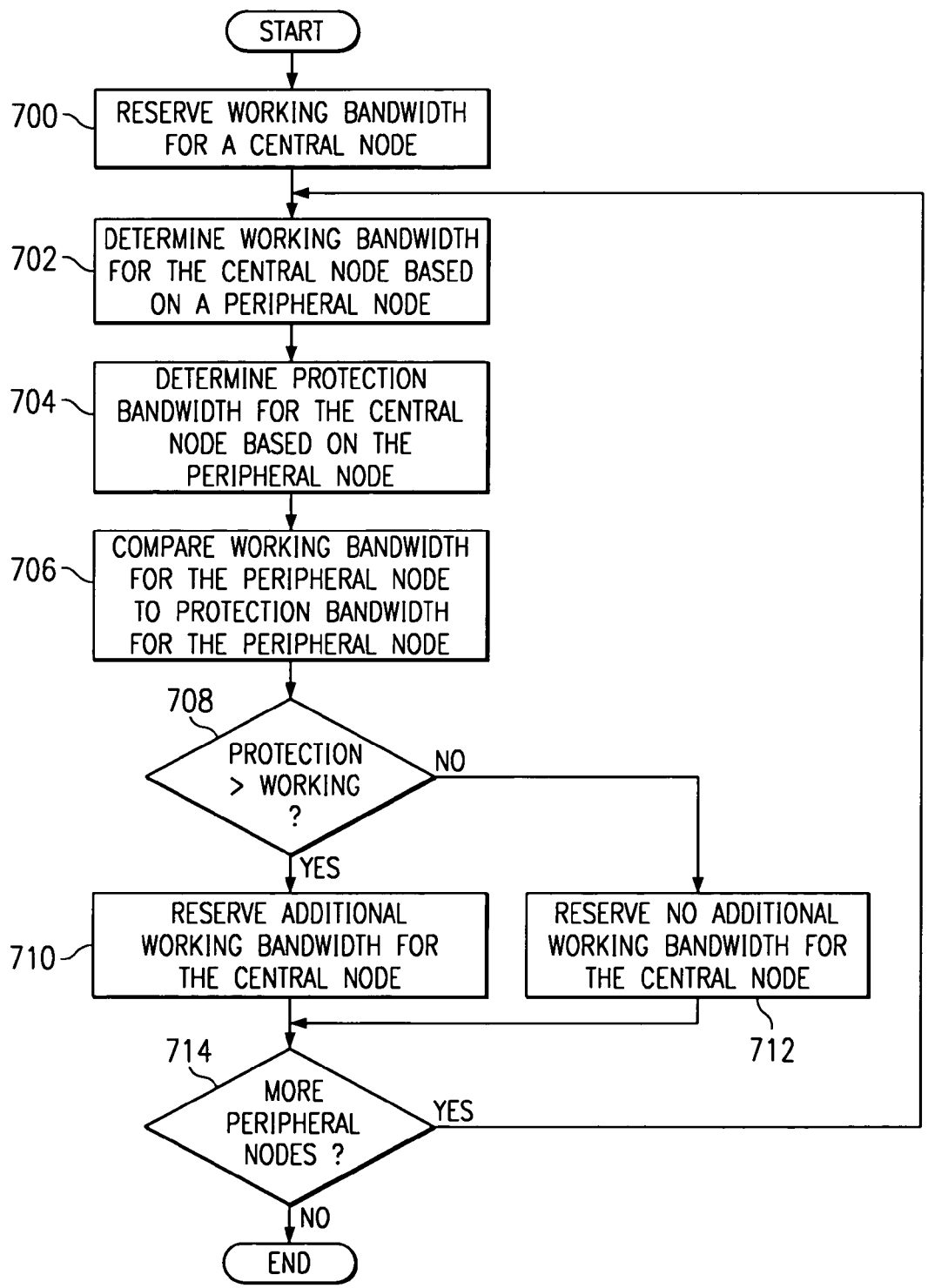
FIG. 7 is a flow diagram illustrating a method for reserving bandwidth for connectionless signals communicated between the nodes of FIG. 1 in accordance with one embodiment of the present invention.

FIG. 7 is a flow diagram illustrating a method for reserving bandwidth for connectionless signals communicated between the nodes 14 in accordance with one embodiment of the present invention. The method begins at step 700 where a working bandwidth for a central node is reserved. A central node comprises any node 14 operable to receive traffic from a plurality of peripheral nodes.

At step 702, working bandwidth is determined for the central node based on the amount of working traffic that may be received from a particular peripheral node, assuming that the corresponding working path 104 is available. At step 704, protection bandwidth is determined for the central node based on the amount of protection traffic that may be received from the peripheral node, assuming that the corresponding working path 104 is unavailable.

At step 706, the working bandwidth for the central node based on the working traffic from the peripheral node is compared to the protection bandwidth for the central node based on the protection traffic from the peripheral node. At decisional step 708, a determination is made regarding whether the protection bandwidth is greater than the working bandwidth. If the protection bandwidth is greater than the working bandwidth, the method follows the Yes branch from decisional step 708 to step 710. At step 710, additional working bandwidth is reserved for the central node in accordance with the difference between the protection bandwidth and the working bandwidth associated with the peripheral node.

Returning to decisional step 708, if the protection bandwidth is not greater than the working bandwidth, the method follows the No branch from decisional step 708 to step 712. At step 712, no additional working bandwidth is reserved for the central node based on the peripheral node.

From steps 710 and 712, the method continues to decisional step 714. At decisional step 714, a determination is made regarding whether there are more peripheral nodes that may contribute to the bandwidth requirement for the central node. If there are more peripheral nodes, the method follows the Yes branch from decisional step 714 and returns to step 702 in order to determine whether or not to reserve additional bandwidth for another peripheral node. However, if there are no more peripheral nodes, the method follows the No branch from decisional step 714 and comes to an end. In this way, bandwidth is reserved for the central node in accordance with the bandwidth requirements contributed by each of the peripheral nodes from which the central node receives traffic.

According to one embodiment, bandwidth is reserved for the protection paths 100 and 102 to provide protection based on Quality of Service. The following notations are introduced to facilitate the discussion of this embodiment.

The set of all nodes 14 in the telecommunications network will be denoted as $N_T$. Each node 14 can be expressed as $I_x$ where x is the index of the set $N_T$. The count of this set is $C(N_T)$.

The set of all unidirectional links in the telecommunications network will be denoted as $L_T$. Each member of $L_T$ will be represented as $l_i$, with i being the index of the set $L_T$. The count of this set is $C(L_T)$.

Bandwidth reservation involves a determination of the required link bandwidth for protection purposes, expressed as $P_{l_x}$ for any link $l_x$ inside the network. In determining protection bandwidth reservation for a link $l_x$, traffic from other links and nodes 14 onto link $l_x$ are considered, as discussed below.

For any working link $l_y$ inside the network that sends working traffic onto link $l_x$, the bandwidth for this portion of the traffic on link $l_x$ is expressed as $B_w(l_y/l_x)$ (bandwidth of the working traffic from $l_y$ to $l_x$). If link $l_y$ is broken, such traffic disappears.

For any broken link $l_y$ inside the network, bandwidth for the protection traffic directed onto link $l_x$ due to the broken status of link $l_y$ is expressed as $B_p(l_y/l_x)$.

For any working node $I_y$ inside the network that sends working traffic onto link $l_x$, the bandwidth for this portion of the traffic on link $l_x$ is expressed as $B_w(I_y/l_x)$ (bandwidth of the working traffic from node $I_y$ to $l_x$). If node $I_y$ is broken, such traffic disappears.

For any broken node $I_y$ inside the network, bandwidth for the protection traffic directed onto link $l_x$ due to the broken status of node $I_y$ is expressed as $B_p(I_y/l_x)$.

Thus, for protecting against a failure on link $l_y$, the protection bandwidth on link $l_x$, expressed as $P_{lx}(l_y)$, is given by:

$$P_{lx}(l_y) = \max(0, B_p(l_y/l_x) - B_w(l_y/l_x)) \quad \text{(eqn. 1)}$$

Similarly, for protecting against a failure on node $I_y$, the protection bandwidth on link $l_x$, expressed as $P_{lx}(I_y)$, is given by:

$$P_{lx}(I_y) = \max(0, B_p(I_y/l_x) - B_w(I_y/l_x)) \quad \text{(eqn. 2)}$$

Thus, an array can be established by considering each link and node 14 inside the network as follows:

$$[P_{lx}(l_1), \ldots, P_{lx}(l_{C(L_T)}), P_{lx}(I_1), \ldots, P_{lx}(I_{C(N_T)})] \quad \text{(eqn. 3)}$$

The array expressed in equation 3 can be numerically sorted and expressed as $\{p_1, p_2, \ldots, p_n\}$ with $p_1 \geq p_2 \geq \ldots \geq p_n$ and $n = C(L_T) + C(N_T)$. For a single failure inside the network, the amount of bandwidth required for protection purposes is:

$$P_{lx} = p_1 \quad \text{(eqn. 4)}$$

For M failures, the amount of the bandwidth required for protection purposes is:

$$P_{lx} = \left(\sum_{j=1}^{M} p_j\right) \quad \text{(eqn. 5)}$$

Based on equation 3, it is also possible to specify a set of multiple failures for protection, depending on the protection policy (based on the importance of protecting certain links over others). Thus, this reservation mechanism minimizes the amount of bandwidth to be reserved for protection purposes.

Although the present invention has been described with several embodiments, various changes and modifications may be suggested to one skilled in the art. It is intended that the present invention encompasses such changes and modifications as fall within the scope of the appended claims.

What is claimed is:

1. A method for providing protection for connectionless signals in a telecommunications network comprising a plurality of nodes each comprising at least two egress ports, where at least one of the egress ports comprises a protection egress port for a specified ingress port and a specified destination node, the method comprising:
   generating a working path for connectionless signals from each of the nodes to a destination node;
   generating a first protection path for connectionless signals from each of the nodes to a destination node;
   generating a second protection path for connectionless signals from each of the nodes to the destination node, the portion of the second protection path between any particular node and the destination node is distinct from the portion of the first protection path between that particular node and the destination node such that the portions of the first and second protection paths do not have any common nodes or links other than that particular node and the destination node; and
   routing protection traffic along one of the protection paths to the destination node;
   wherein generating the first protection path and generating the second protection path each comprise decomposing the telecommunications network into a ring and at least one ear transmitting protection traffic received at the specified ingress port for the specified destination node from the protection egress port; and discarding protection traffic received at the specified ingress port for the specified destination node when the status for the protection egress port is unavailable.

2. The method of claim 1, decomposing the telecommunications network further comprising charting the ring horizontally beginning with the destination node and ending with the destination node.

3. The method of claim 2, decomposing the telecommunications network further comprising ordering the ears and charting the ears horizontally based on the order of the ears.

4. The method of claim 3, generating the first protection path further comprising generating the first protection path in a first direction based on the charted ring and ears and generating the second protection path further comprising generating the second protection path in a second direction based on the charted ring and ears.

5. The method of claim 1, further comprising:
   classifying received traffic as working traffic or protection traffic; and
   routing protection traffic comprising routing protection traffic based on the classification of the received traffic as working traffic or protection traffic.

6. The method of claim 5, routing protection traffic further comprising routing along the first protection path the protection traffic received on the first protection path and routing along the second protection path the protection traffic received on the second protection path.

7. The method of claim 6, further comprising:
   determining which of the first and second protection paths to the destination node comprises a shorter path; and routing received working traffic as protection traffic onto the protection path comprising the shorter path.

8. A system for providing protection for connectionless signals in a telecommunications network comprising a plurality of nodes, the system comprising:

a plurality of nodes operable to receive and transmit connectionless signals and be decomposed into a ring and at least one ear, the plurality of nodes comprising a destination node wherein each of the plurality of nodes comprises at least two egress ports, at least one of the egress port comprising a protection egress port for a specified ingress port and a specified destination node, the protection egress port operable to transmit protection traffic received at the specified ingress port for the specified destination node, each of the nodes further comprising an egress port selector operable to select an egress port for transmitting traffic for the node and the discard protection traffic received at the specified ingress port for the specified destination node when the status for the protection egress port is unavailable;

a working path for connectionless signals from each of the nodes to the destination node;

a first protection path for connectionless signals from each of the nodes to the destination node;

a second protection path for connectionless signals from each of the nodes to the destination node, the portion of the second protection path between any particular node and the destination node is distinct from the portion of the first protection path between that particular node and the destination node such that the portions of the first and second protection paths do not have any common nodes or links other than that particular node and the destination node; and each of the nodes operable to transmit protection traffic for the destination node along the first protection path and along the second protection path.

9. The system of claim 8, each of the nodes comprising a protection egress port identifier operable to identify one of the egress ports as the protection egress port.

10. The system of claim 9, each of the nodes further comprising an egress port evaluator operable to evaluate a status for each of the ports.

11. The system of claim 8, each of the nodes further comprising a working traffic egress port identifier operable to identify one of the ports as a working traffic egress port for a specified ingress port and a specified destination node, the working traffic egress port operable to transmit working traffic received at the specified ingress port for the specified destination node.

12. The system of claim 11, each of the nodes further comprising a secondary protection egress port identifier operable to identify one of the ports as a secondary protection egress port for a specified destination node, the secondary protection egress port operable to transmit as protection traffic the working traffic received at the node for the specified destination node.

13. The system of claim 12, each of the nodes further comprising a traffic classifier operable to classify received traffic as working traffic or protection traffic.

14. The system of claim 13, the egress port selector operable to select an egress port for transmitting traffic for the node based on the classification of the received traffic as working traffic or protection traffic and based on the status for the egress ports.

* * * * *